(12) United States Patent
Xu et al.

(10) Patent No.: US 10,706,229 B2
(45) Date of Patent: Jul. 7, 2020

(54) CONTENT AWARE HETEROGENEOUS LOG PATTERN COMPARATIVE ANALYSIS ENGINE

(71) Applicant: NEC Laboratories America, Inc., Princeton, NJ (US)

(72) Inventors: Jianwu Xu, Lawrenceville, NJ (US); Hui Zhang, Princeton Junction, NJ (US); Haifeng Chen, West Windsor, NJ (US); Tanay Kumar Saha, Indianapolis, IN (US)

(73) Assignee: NEC Corporation, Tokyo (JP)

( * ) Notice: Subject to any disclaimer, the term of this patent is extended or adjusted under 35 U.S.C. 154(b) by 11 days.

(21) Appl. No.: 16/145,580

(22) Filed: Sep. 28, 2018

(65) Prior Publication Data

US 2019/0095417 A1 Mar. 28, 2019

Related U.S. Application Data

(60) Provisional application No. 62/564,556, filed on Sep. 28, 2017.

(51) Int. Cl.
*G06F 17/40* (2006.01)
*G06F 40/211* (2020.01)
(Continued)

(52) U.S. Cl.
CPC ............ *G06F 40/211* (2020.01); *G06F 7/06* (2013.01); *G06F 17/40* (2013.01); *G06F 40/216* (2020.01); *G06F 40/284* (2020.01); *G06F 40/30* (2020.01)

(58) Field of Classification Search
CPC .. G06F 17/2785; G06F 16/285; G06F 17/271; G06F 16/35; G06F 16/355;
(Continued)

(56) References Cited

U.S. PATENT DOCUMENTS 6,523,026 B1 * 2/2003 Gillis .................. G06F 16/3332
2006/0256114 A1 * 11/2006 Nielsen .................. G06K 9/342
345/440

(Continued)

OTHER PUBLICATIONS

Hamooni, "LogMine: Fast Pattern Recognition for Log Analytics", Proceedings of the 25th ACM International Conference on Information and Knowledge Management, Oct. 2016, pp. 1573-1582.

(Continued)

*Primary Examiner* — Huyen X Vo
(74) *Attorney, Agent, or Firm* — Joseph Kolodka (57) ABSTRACT

A computer-implemented method, system, and computer program product are provided for content aware heterogeneous log pattern comparative analysis. The method includes receiving, by a processor-device, a plurality of heterogeneous logs. The method also includes extracting, by the processor-device, a plurality of log syntactic patterns from the plurality of heterogenous logs. The method additionally includes generating, by the processor-device, latent representation vectors for each of the plurality of log syntactic patterns. The method further includes predicting, by the processor-device, an anomaly from the clustered latent representation vectors. The method also includes controlling an operation of a processor-based machine to react in accordance with the anomaly.

2 Claims, 7 Drawing Sheets

(51) Int. Cl.
   *G06F 7/06* (2006.01)
   *G06F 40/30* (2020.01)
   *G06F 40/216* (2020.01)
   *G06F 40/284* (2020.01)

(58) Field of Classification Search
   CPC .. G06F 16/288; G06F 16/3344; G06F 16/245; G06F 16/353; G06F 16/367; G06F 17/27; G06F 17/2818; G06F 16/22; G06F 16/9027; G06F 40/30; G06F 16/3347; G06F 16/3329; G06F 16/3331; G06F 40/20; G06F 40/205; G06F 40/284
   See application file for complete search history.

(56) References Cited

U.S. PATENT DOCUMENTS

| | | | |
|---|---|---|---|
| 2013/0246315 A1* | 9/2013 | Joshi | G06N 5/04 706/10 |
| 2018/0060314 A1 | 3/2018 | Xu et al. | |
| 2018/0349388 A1* | 12/2018 | Skiles | G06F 3/0482 |

OTHER PUBLICATIONS

Ning, "HLAer: A System for Heterogeneous Log Analysis", SDM Workshop on Heterogeneous Learning, Apr. 2014, pp. 1-22.

Kusner, "From Word Embeddings to Document Distances", International Conference on Machine Learning, Jul. 2015, pp. 957-966.

Smith, "Identification of Common Molecular Subsequences", Journal of Molecular Biology, vol. 147, No. 1, Mar. 1981, pp. 195-197.

Sokal, "A Statistical Method for Evaluating Systematic Relationships", University of Kansas Science Bulletin, vol. 38, Mar. 1958 pp. 1409-1438.

Mikolov, "Distributed Representations of Words and Phrases and their Compositionality", Advances in Neural Information Processing Systems Oct. 26, 2013, pp. 1-9.

Ester, "A Density-Based Algorithm for Discovering Clusters in Large Spatial Databases with Noise", Proceedings of the 2nd International Conference on Knowledge Discovery and Data Mining, Aug. 1996, pp. 226-231.

Rousseeuw, "Silhouettes: a Graphical Aid to the Interpretation and Validation of Cluster Analysis", Computational and Applied Mathematics, vol. 20, Nov. 1987, pp. 53-65.

The rule and format of regular expression, can be referred to the website: http://www.zytrax.com/tech/web/regex.htm, page last modified Aug. 17, 2017, pp. 1-32.

Ratnaparkhi, "Learning to Parse Natural Language with Maximum Entropy Models", Machines Learning, vol. 34, Feb. 1999, pp. 151-175.

Unitex/GramLab, "Lexicon-based Corpus Processing Suite", can be referred to website: http://unitexgramlab.org, accessed on Apr. 19, 2017, pp. 1-7.

Xerox Research Centre Europe, "XeLDA: Xerox Linguistic Development Architecture", can be referred to website: http://www.xrce.xerox.com/About-HRCE/History/Past-Research/XeLDA, accessed on Apr. 19, 2017, pp. 1-3.

* cited by examiner

150

Heterogeneous Logs
110

2017/08/15 5:12:23 2341 Information Reply : Drive Fault status = 5h

2017/08/15 12:34:03 382234 Reply : Drive Fault status = 20h

Log Patterns
155

%{timestamp} %{Base16Number:P1F1} Information Reply : Drive Fault status = %{NotWhiteSpace:P1F2}

%{timestamp} %{Base16Number:P2F1} Reply : Drive Fault status = %{NotWhiteSpace:P2F2}

# CONTENT AWARE HETEROGENEOUS LOG PATTERN COMPARATIVE ANALYSIS ENGINE

BACKGROUND

Technical Field

The present invention relates to system maintenance and more particularly system maintenance with a heterogeneous log-based system failure management engine.

Description of the Related Art

In log-based system maintenance and monitoring management technology, computer software logs are generated and used for analysis and retrieval. One challenge is to extract actionable insights from huge amounts of heterogeneous operation logs produced from multiple sub-components. A fundamental element of heterogeneous logs is the log template, which is the generation schema to produce the final logs. The log template, or log pattern, creates the structure information out of the unstructured logs. The actionable insights consist of relationships among different log patterns.

SUMMARY

According to an aspect of the present invention, a computer-implemented content aware heterogeneous log pattern comparative analysis method is provided. The method includes receiving, by a processor-device, a plurality of heterogeneous logs. The method also includes extracting, by the processor-device, a plurality of log syntactic patterns from the plurality of heterogenous logs. The method additionally includes generating, by the processor-device, latent representation vectors for each of the plurality of log syntactic patterns. The method further includes predicting, by the processor-device, an anomaly from the clustered latent representation vectors. The method also includes controlling an operation of a processor-based machine to react in accordance with the anomaly.

According to another aspect of the present invention, a computer program product is provided for content aware heterogeneous log pattern comparative analysis. The computer program product comprising a non-transitory computer readable storage medium having program instructions. The program instructions are executable by a computer to cause the computer to perform a method. The method includes receiving, by a processor-device, a plurality of heterogeneous logs. The method also includes extracting, by the processor-device, a plurality of log syntactic patterns from the plurality of heterogenous logs. The method additionally includes generating, by the processor-device, latent representation vectors for each of the plurality of log syntactic patterns. The method further includes predicting, by the processor-device, an anomaly from the clustered latent representation vectors. The method also includes controlling an operation of a processor-based machine to react in accordance with the anomaly.

According to another aspect of the present invention, a content aware heterogeneous log pattern comparative analysis system is provided. The anomaly detection system includes a processing system having a processor and memory coupled to the processor. The processing system programmed to receive a plurality of heterogeneous logs. The processing system is also programmed to extract a plurality of log syntactic patterns from the plurality of heterogenous logs. The processing system is additionally programmed to generate latent representation vectors for each of the plurality of log syntactic patterns. The processing system is further programmed to predict an anomaly from the clustered latent representation vectors. The processing system is also programmed to control an operation of a processor-based machine to react in accordance with the anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for a content aware heterogeneous log pattern comparative analysis engine. Because a log pattern can be generated based on the log's syntactic information, a log syntax pattern can be the absence of semantic information in the logs.

Figure 1:
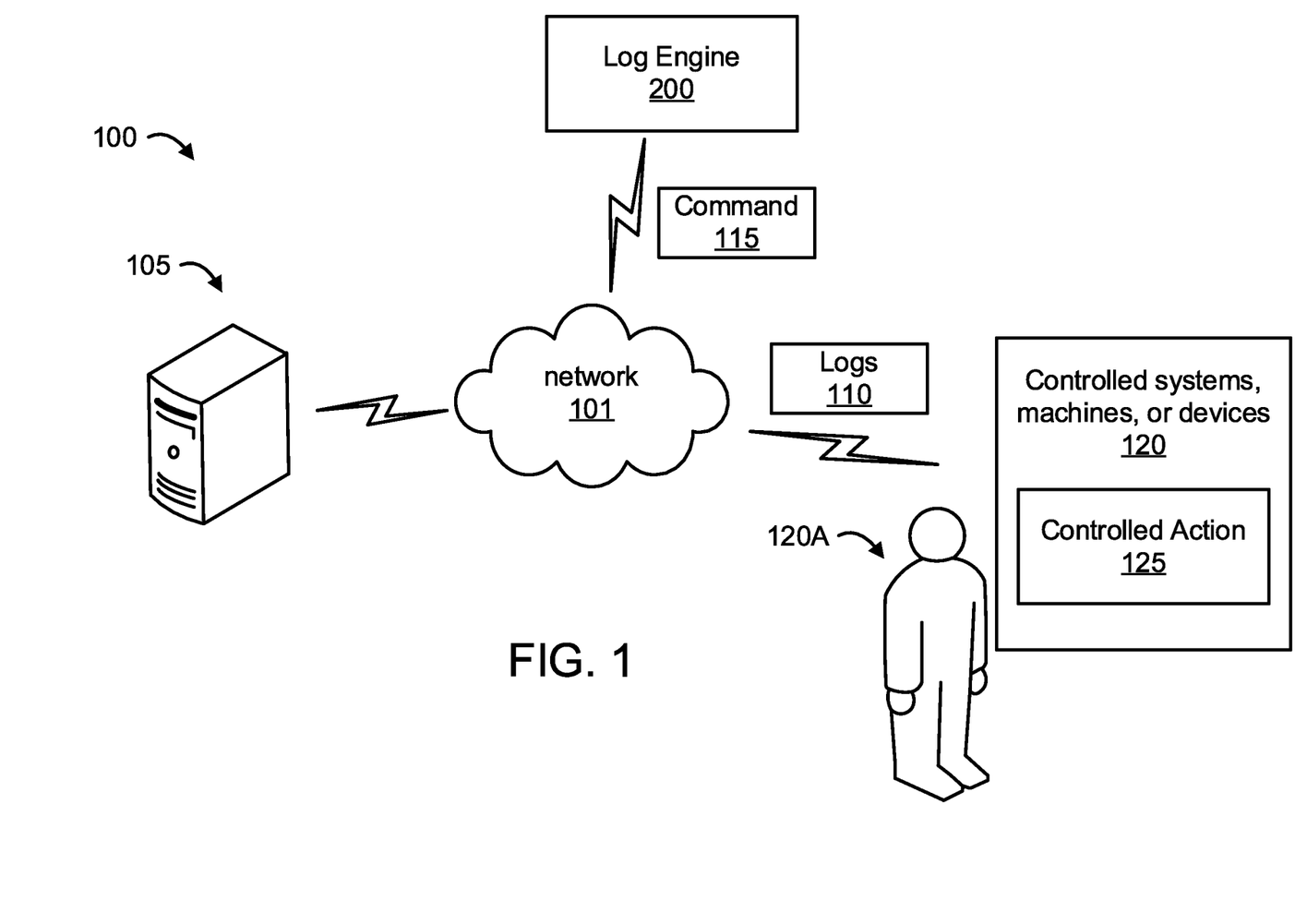
FIG. 1 is a block diagram of an exemplary environment to which the present invention can be applied, in accordance with an embodiment of the present invention.

Referring now in detail to the figures in which like numerals represent the same or similar elements and initially to FIG. 1, a block diagram of an exemplary environment 100 is illustratively depicted in accordance with one embodiment of the present invention. The environment 100 is representative of a computer network to which the present invention can be applied. The elements shown relative to FIG. 1 are set forth for the sake of illustration. However, it is to be appreciated that the present invention can be applied to other network configurations and other operational environments as readily contemplated by one of ordinary skill in the art given the teachings of the present invention provided herein.

The environment 100 at least includes at least one content aware heterogeneous log pattern comparative analysis engine 200, at least one computer processing system 105, at least one controlled system(s), machine(s), and/or device(s) (individually and collectively denoted by the reference numeral 120 and hereinafter referred to as "controlled system"). For the sake of simplicity and illustration, the preceding elements are shown in singular form, but can be readily extended to more than one of any of the preceding elements as readily appreciated by one of ordinary skill in the art given the teachings of the present invention provided herein. The computer processing system 105 can be any type of computer processing system including, but not limited to, servers, desktops, laptops, tablets, smart phones, media playback devices, and so forth, depending upon the particular implementation. For the sake of illustration, the computer processing system 105 is a server. The controlled system 120 can be a single machine, a group of machines connected by a network, a computer processing system, a group of remote machines connected by a wide area network, etc. A machine can be a simple machine or a complex machine with multiple components, parts, systems, and sub-systems.

The at least one content aware heterogeneous log pattern comparative analysis engine 200 is configured to detect anomalies 285 from heterogenous logs 110 based on log syntactic patterns 150. The at least one content aware heterogeneous log pattern comparative analysis engine 200 can receive the heterogeneous logs 110 related to the controlled system 120 to detect anomalies 285 that can lead to one or more fault events. The computer processing system 105 can also receive the anomalies 285 from the at least one content aware heterogeneous log pattern comparative analysis engine 200. The at least one content aware heterogeneous log pattern comparative analysis engine 200 or the computer processing system 105 can perform a controlled action 125 in the controlled system 120 or another device responsive to the anomalies 285 by sending a command 115 to the controlled system, machine, and/or device 120. The controlled action 125 can include, e.g., adjusting a fan speed or orientation, adjusting a processor multiplier, adjusting current flow or routing in the controlled system 120, turning on an exhaust fan in a laboratory, disabling a computer system or sectors of memory in the controlled system 120 as a quarantine measure, shutting down or disabling a system or component in the controlled system 120 to protect a user 602A, locking a security door based on the anomalies 285, or other actions that can be performed to control the controlled system 120.

In the embodiment shown in FIG. 1, the elements thereof are interconnected by a network(s) 101. However, in other embodiments, other types of connections (e.g., wired, etc.) can also be used. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 100 are readily determined by one of ordinary skill in the art, given the teachings of the present invention provided herein.

Figure 2:
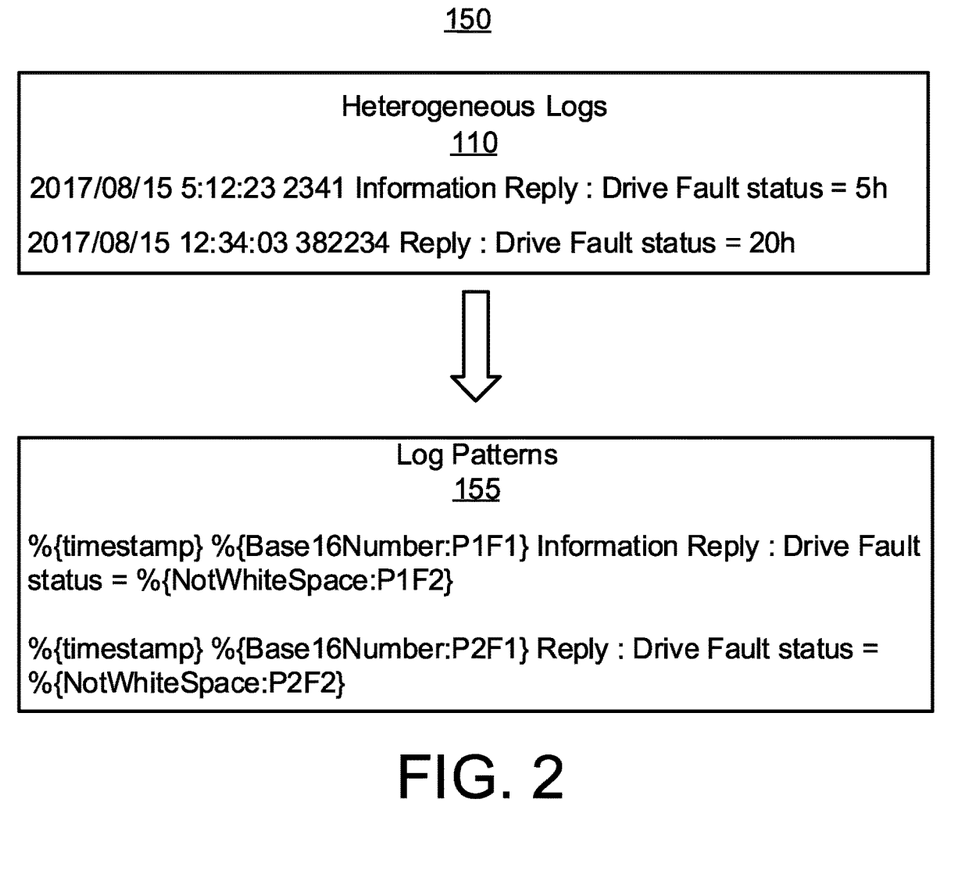
FIG. 2 is examples of log syntactic patterns, in accordance with an embodiment of the present invention.

Referring now in detail to the figures in which like numerals represent the same or similar elements and initially to FIG. 2, examples of log syntactic patterns 150 are illustratively depicted in accordance with one embodiment of the present invention. The log syntax patterns can include heterogeneous logs 110 and log patterns 155. The heterogeneous logs 110 have slightly different formats and would thus produce different log patterns 155. The format difference comes from the slight variation arrangement of tokens (words separated by space) inside each of the log patterns 155. On the other hand, the log patterns 155 are semantically similar, e.g., all the logs convey the same information to a system administrator. Therefore, the actionable insights built from the relationships between the log patterns 155 will not offer any meaningful information. In a multi-subcomponent distributed computing configuration, this scenario might arise quite often because of different logging practices. For a log-based system failure management engine which aims at extraction of inter-dependency relationships among different sub-components, it is important to overcome the redundancy of generation of semantically similar but syntactically different log patterns. In this approach, the actionable insight obtained by the log analytics technology will be able to detect anomalies and support system administrators in identifying the correct causes of failures. Another situation happens in system failure classification where comparative data mining can be used to discover different log patterns unique to different types of system failures. The discovered log patterns can be expected to be semantically different because different failure causes have log patterns 155 with different meaning. Therefore, identifying and removing those semantically similar but syntactically different log patterns 155 in both multi-subcomponent analysis and system failure classification situations can improve the log-based system failure management engine.

On the other hand, the generation of log syntactic patterns 150 can depend on the parameter tuning in an unsupervised learning method. Different parameters can lead to different log syntactic patterns 150 with similar semantic information. Since the unsupervised learning method can be sensitive to various parameters, which can be chosen separately for different system sub-components, it can be possible that system failure classification and fault diagnosis results can be sensitive to the parameters. Therefore, a post-processing method to select a subset of log syntactic patterns from multiple subcomponents and make the system failure classification and fault diagnosis results robust to parameter tunings can improve the log-based system failure management engine.

The content aware heterogeneous log pattern comparative analysis engine 200 can automatically identify semantically similar log syntactic patterns 150 in multi-subcomponents system fault diagnosis and failure classification scenarios. By removing the discovered semantically similar log patterns, the failure classification signatures extraction can become more accurate since the failure classification signatures extraction will capture only those log patterns which are semantically unique to different failures. Meanwhile, the relationship among the semantically different log syntactic patterns 150 will be more meaningful and useful in finding the correct fault cause in multi-subcomponent system failure analysis. The content aware heterogeneous log pattern comparative analysis engine 200 can also handle the issue of parameter sensitivity in log syntactic patterns 150 generation because the content aware heterogeneous log pattern comparative analysis engine 200 can filter out semantically similar log patterns.

Given the log syntactic patterns 150 from multi-subcomponent system or multi-failure classification scenario, the content aware heterogeneous log pattern comparative analysis engine 200 represents the log patterns 155 in a d-dimensional metric space and employs Word Movers' Distance (WMD) to calculate the distance among all pair of patterns. The WMD distance measures the dissimilarity between two log patterns as the minimum amount of distance that the embedded words of one log pattern need to "travel" to reach the embedded words of another log pattern. Based on the pair-wise WMD distance among all log patterns, the content aware heterogeneous log pattern comparative analysis engine 200 employs a density based clustering method to group semantically similar log patterns. If two log syntactic patterns originated from different system failures or different subcomponents are clustered together, then these two log syntactic patterns share similar semantic information and therefore will be removed from the final log patterns set.

The content aware heterogeneous log pattern comparative analysis engine 200 automatically identifies semantically similar log syntactic patterns 150 in multi-subcomponents system fault diagnosis and failure classification scenarios. The failure classification signatures extraction can become more accurate by capturing only those log patterns 155 which are semantically unique to different failures. The relationship among the semantically different log syntactic patterns 150 can be more meaningful and useful in finding the correct fault cause in multi-subcomponent system failure analysis. The content aware heterogeneous log pattern comparative analysis engine 200 can also handle the issue of parameter sensitivity in log syntactic patterns generation by filtering out semantically similar log patterns.

Figure 3:
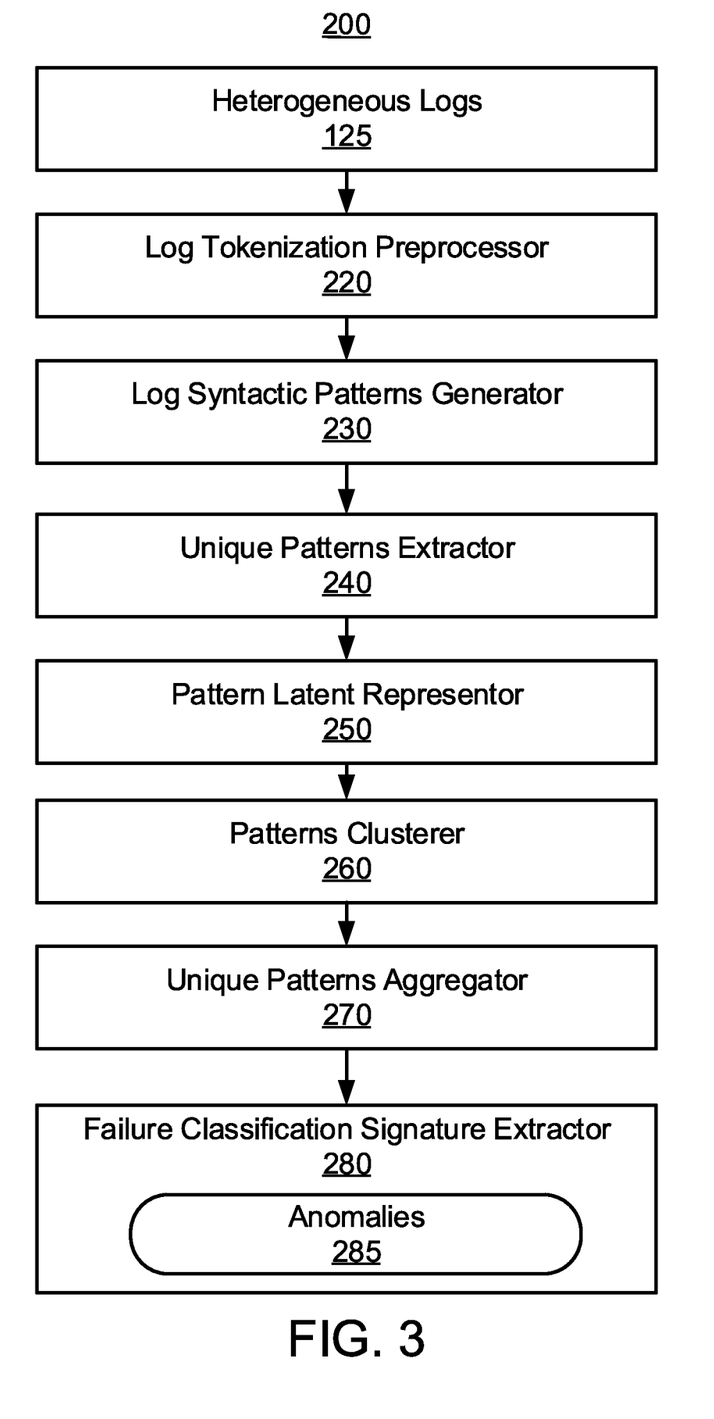
FIG. 3 is a block/flow diagram illustrating a content aware heterogeneous log pattern comparative analysis engine, in accordance with an embodiment of the present invention.

Referring now to FIG. 3, a block/flow diagram of a content aware heterogeneous log pattern comparative analysis engine 200 is illustratively depicted in accordance with an embodiment of the present invention. The content aware heterogeneous log pattern comparative analysis engine 200 can include heterogeneous logs 110. The heterogeneous logs 110 can come from arbitrary systems or software applications that produce logs to record system events, status or any other information. The heterogeneous logs 110 can be transported into the content aware heterogeneous log pattern comparative analysis engine 200 via a streaming process, message transporter, file transfer or other manners. The heterogeneous logs 110 can include unstructured text content with one or more fields. The heterogeneous logs 110 can also include timestamps.

The heterogeneous logs 110 can be fed into a log tokenization preprocessor 220. The log tokenization preprocessor 220 can tokenize the heterogeneous logs 110. The tokenization preprocessing can be accomplished by splitting the heterogeneous logs 110 with a set of predefined or user-supplied delimiters. This tokenization preprocessing technique can be applicable for both single-byte and multi-byte character encodings. Various types of time stamp formats can also be recognized, matched, and standardized. The log tokenization preprocessor 220 can also provide an interface for users to manually input rules so that the log tokenization preprocessor 220 can take a users' input and tokenize the heterogeneous logs 110 if any strings are matched against the rules. Furthermore, the log tokenization preprocessor 220 can include an interface for users to a provide structure of specific log formats such as a CSV file. The tokens are the smallest units of the operational logs, which are the building elements of a composite logs or heterogeneous logs 110. Therefore, the tokenization process brings semi-structure information to the unstructured logs.

The log tokenization preprocessor 220 can feed tokenized heterogenous logs into a log syntactic patterns generator 230. The log syntactic patterns generator 230 can produce log syntactic patterns 150 using an automated unsupervised clustering method. The automated unsupervised clustering method can aggregate multiple logs with similar structural information into clusters. The similarity measure can be defined as the token category similarity. Once the logs are clustered, the log syntactic patterns generator 230 can merge all of the logs to produce the final regular expression format as the log syntactic patterns 150. Each merge step can leverage the Smith-Waterman algorithm to align log patterns. Initially, the sequential merge process can be utilized. After several rounds of merge operations, when sequential merges fail to produce a good performance, the log syntactic patterns generator 230 can resort to the Unweighted Pair Group Method with Arithmetic Mean (UPGMA) method or other agglomerative (bottom-up) hierarchical clustering method. A cost function that determines the generality of patterns can be employed to identify the end of pattern recognition procedures once the cost is within certain predefined threshold. An example of the cost function can be given as:

$$\frac{1}{|A||B|}\sum_{x \in A}\sum_{y \in B} d(x, y)$$

where A, B are two log messages and x, y are tokens within each log message. The distance d(x, y) for any two log tokens can be defined as:

$$d(x, y) = \begin{cases} 1 & \text{if two tokens are both numerical} \\ 1 & \text{if two tokens are identical word} \\ 1 & \text{if two tokens are identical symbols} \\ 0 & \text{otherwise} \end{cases}$$

The log syntactic patterns 150 capture the structural information of the heterogeneous logs 110. Each of the tokens can be treated as a unit after log tokenization preprocessing and a log can be an ordered composition of all tokens. If the order of token units switch, then the log syntactic patterns generator 230 will produce different syntactic patterns.

In multi-subcomponents system fault diagnosis or failure classification applications, the log tokenization preprocessor 220 and the log syntactic patterns generator 230 can be applied to different components or different failure cases. Each set of logs corresponding to a different subcomponent or system failure category can cause the log tokenization preprocessor 220 and the log syntactic patterns generator 230 to produce a different set of log syntactic patterns 150. These different sets of syntactic patterns 150 represent each subcomponent system's dynamics or each system failure. The unique pattern extractor 240 can analyze multiple sets of syntactic log patterns 150 from the log tokenization preprocessor 220 and the log syntactic patterns generator 230 to identify a subset of patterns which are unique to its corresponding submodule or failure type based on exact comparison. The final multiple subsets of log syntactic patterns 150 can be unique and/or typical to different failure categories. However, because log syntactic patterns 150 only consider the syntax of logs without considering semantic information, there can be redundant log patterns across different subsets. The content aware heterogeneous log pattern comparative analysis engine 200 can further remove those redundant log patterns, which are syntactically different but semantically similar, in order to obtain more accurate description of inter-dependency relationship and failure signatures for different fault categories.

The unique pattern extractor 240 can feed log syntactic patterns 150 to a pattern latent representor 250. The pattern latent representor 250 can transform log syntactic patterns 150 into a latent representation in a vector format. The pattern latent representor 250 can be based on language modeling techniques. The pattern latent representor 250 can first employ a word to vector (word2vec) technique for individual pattern field embedding. The word2vec technique can take a large number of pattern field tokens and project them into an embedded metric space, the number of dimensions in the embedded space can vary, e.g., several hundred dimensions, several thousand dimensions, etc. Each unique pattern field token can be assigned a corresponding vector in that space. Because the embedded metric space supports vector algebraic operations, the pattern latent representor 250 can take the average of all the corresponding vectors from pattern field tokens in a given log pattern and denote the average as the final latent vector representation of the log syntactic pattern 150.

Figure 4:
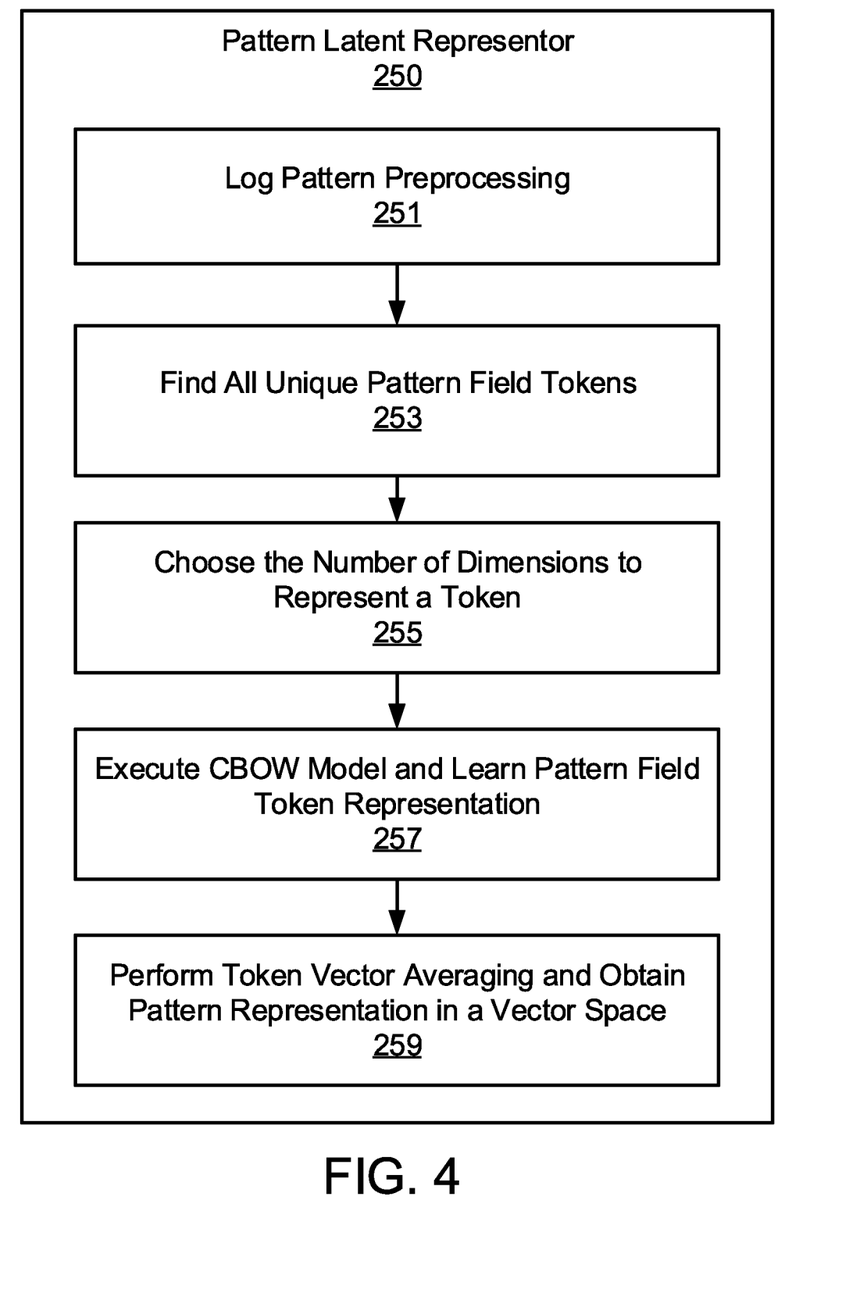
FIG. 4 is a block/flow diagram further illustrating the pattern latent representor of FIG. 3, in accordance with an embodiment of the present invention.

Referring now to FIG. 4, a block/flow diagram is depicted that further illustrates how the pattern latent representor 250 of FIG. 3 obtains the final latent vector representation of the log syntactic pattern 150 in accordance with an embodiment of the present invention. The pattern latent representor 250 can perform log pattern preprocessing 251 and find all unique pattern field tokens 253. The pattern latent representor 250 can also choose the number of dimensions to represent a token 255. The pattern latent representor 250 can additionally execute a continuous bag of words (CBOW) model and learn pattern field token representation 257. The pattern latent representor 250 can also perform token vector averaging and obtain pattern representations in vector space 259.

In block 251, the pattern latent representor 250 can preprocess log syntactic patterns 150 to remove distinctive identifiers. The preprocessing is useful because the log syntactic patterns 150 can include distinctive identifiers in each regular expression field. For example, a %{BASE16NUMBER:PxFy} field has the identifier PxFy, which denotes Field number y in Pattern ID x. This distinctive identifier is necessary in the log analytic management for differentiation of different patterns and different fields. However, in pattern latent representation, these distinctive identifiers should be removed because the pattern latent representor 250 can be based on categories of different pattern field content. The same category of pattern field regular expressions in different syntactic patterns should be considered the same because they share the same semantic information even though the identifier could be different, e.g., in different patterns at different field locations. The pre-processed log syntactic patterns with the distinctive identifiers removed can be delimited to find unique pattern field tokens.

In block 253, the pattern latent representor 250 can delimit the pre-processed log patterns to find all unique pattern field tokens. The pre-processed log patterns are delimited because each of the pre-processed log patterns can have a mixture of regular expressions (variables) and words/symbols (constants). The pattern field tokens can be obtained by splitting the pre-processed log patterns by a whitespace delimiter. The pattern latent representor 250 can extract the unique pattern field tokens by sorting and removing duplicates from the pre-processed log patterns. The total number of unique field tokens can also be obtained when all unique pattern field tokens.

In block 255, the pattern latent representor 250 can choose a number of dimensions that represent a token from all the unique pattern field tokens and the total number of unique field tokens. The total number of unique pattern field token can be the maximum number of dimension utilized to represent the tokens. The number of dimension chosen can be much less than the total number of unique tokens, e.g., 200-500 dimension can be utilized for the latent representation of pattern field tokens. The number of dimensions can be utilized when learning filed token representations in a metric space.

In block 257, the pattern latent representor 250 can execute a CBOW model to learn field token representations in a metric space. The CBOW model can learn the representation of pattern field tokens in a d-dimensional metric space where d is the number of dimensions. Each field token can be embedded in the metric space where algebraic operations can be performed to obtain various token relationships. Given the log patterns 155 are composed of a sets of field tokens, the CBOW model can predict each of the tokens given some contextual tokens using the average of d-dimensional vector representations of the tokens in the context window. As averaging dilutes the word ordering and the model represents the tokens in continuous d-dimensional space which is why this model is called the CBOW model. The CBOW model can be thought of as a multi-class classification model where the number of classes to be predicted is same as the total number of unique tokens. The model initializes the d-dimensional vectors of all the tokens uniformly at random and then utilizes the signal from a prediction stage to refine the initial d-dimensional vector representation, e.g., the model adjusts the weights in such a way so that the model can correctly predict a token given a set of context tokens. The d-dimensional vectors representing the tokens can be employed to obtain a representation of a log pattern that includes the tokens in a d-dimensional vector space.

In block 259, the pattern latent representor 250 can average the token vectors to obtain log pattern representation in the embedded space. After the token representations are learnt in the d-dimensional vector space, the d-dimensional vectors of each of the field tokens in a single log pattern can be summed up and then divided by the number of tokens to obtain the d-dimensional latent representation of the single log pattern. Therefore, the pattern latent representor 250 transforms the log syntactic pattern 150 into a d-dimensional vector in the embedded space that represents the log pattern 155.

The pattern latent representor 250 can feed the d-dimensional vector in the embedded space to a pattern clusterer 260. The pattern clusterer 260 can cluster the log syntactic pattern vectors in the d-dimensional metric space. Each cluster represents a group of the log patterns 155 with different syntax but similar semantics. Therefore, the pattern clusterer 260 considers the semantic similarity of the log patterns 155 when automatically extracting those individual clusters.

Figure 5:
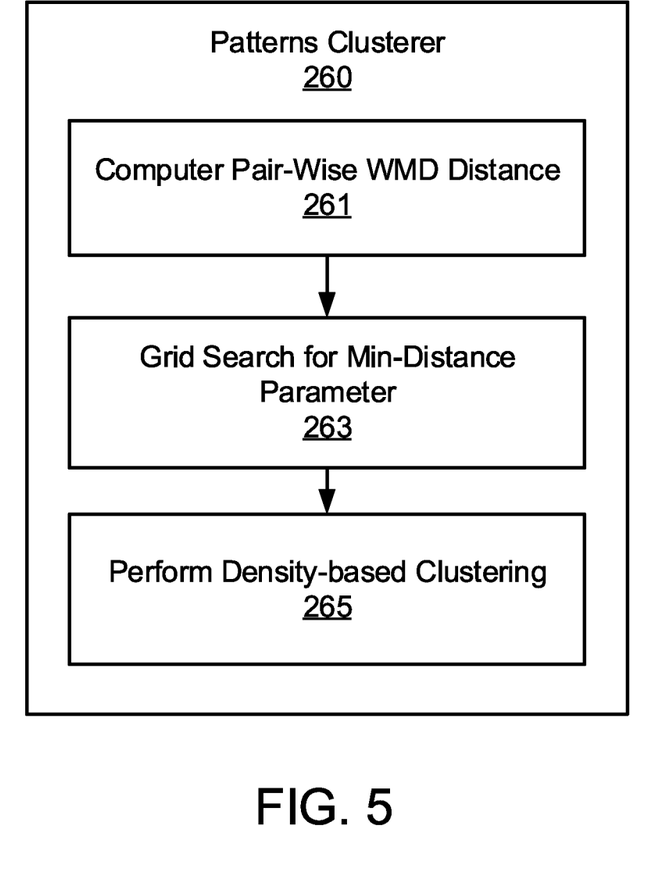
FIG. 5 is a block/flow diagram further illustrating the patterns clusterer of FIG. 3, in accordance with an embodiment of the present invention.

Referring now to FIG. 5, a block/flow diagram is depicted that further illustrates how the patterns clusterer 260 of FIG. 3 extracts clusters based on the d-dimensional vector in the embedded space in accordance with an embodiment of the present invention. The pattern clusterer 260 can include computing pair-wise WMD distance 261, grid searching for Min-Distance parameters 263, and performing density-based clustering 265.

In block 261, the patterns clusterer 260 can compute a pair-wise WMD distance for the d-dimensional vector in the embedded space. For all the tokenized patterns, the latent vector representation is utilized to find the WMD distance between any pairs of the log patterns 155. The WMD distance calculates the amount of movement in vector space to convert one set of vectors to another set of vectors to form min-distance parameters for the d-dimensional vectors.

In block 263, the patterns clusterer 260 can grid search the min-distance parameters to find neighboring points that can fall into a single cluster. Once the pairwise WMD distances among the latent vector representations of the log patterns 155 are calculated, the patterns clusterer 260 can further cluster the patterns. In one example, a density based clustering technique can be used. The primary reason for employing a density based clustering technique is that the technique does not require the user to specify the number of clusters to find arbitrary shaped clusters. However, setting the minimum distance parameter can be difficult because different distributions and dynamics of latent vectors require different optimal parameter. The min-distance can be used to find the neighboring points which can fall into a single cluster. To set the parameter automatically, the pattern clusterer 260 can use an exhaustive search and Silhouette Coefficient as the criterion. The Silhouette Coefficient is an internal measure of clusters which measures the quality of generated clustering based on inter-cluster and intra-cluster distance of points. The Silhouette Coefficient can be calculated as (b−a)/max(a, b) with a being the intra-cluster distance and b being the inter-cluster distance. Grid search methods can seek the optimal value by starting from min-distance of all pair distances among the patterns up to the point of average distance. The value of min-distance which can give the maximum value for the Silhouette Coefficient is chosen.

In block 265, the patterns clusterer 260 can perform density-based clustering utilizing the Silhouette Coefficient. A density-based spatial clustering of applications with noise (DBSCAN) for the latent log pattern vectors can be performed. For DBSCAN, the minimum number of points can be set to form a cluster, e.g., 1, the Silhouette Coefficient, etc., where a single pattern can form a cluster if none of the other patterns fall within the minimum distance threshold. This can occur because it is likely that the unique log patterns from the unique pattern extractor 240 will form multiple clusters with a single log pattern in the cluster. These single pattern clusters are the ones which are both syntactically and semantically unique. The results of the pattern clusterer 260 can be the individual clusters and the association of each log syntactic pattern 150 to corresponding clusters.

The pattern clusterer 260 can feed the individual clusters and the association of each log pattern corresponding to a cluster to a unique pattern aggregator 270. The unique pattern aggregator 270 can analyze the clusters of log syntactic patterns 150 in the latent representation space. The clusters with a single vector inside will be retained because these clusters can include the log patterns 155 which are both syntactically and semantically different. These single pattern clusters represent the unique semantic information useful in multiple system failure diagnosis or multi-subcomponent inter-dependency relationship extraction. On the other hand, the unique pattern aggregator 270 will aggregate those clusters with multiple log patterns because only one pattern from each cluster is needed to represent the corresponding cluster and other patterns share the same semantic information with different syntax.

The unique pattern aggregator 270 can feed the clusters with a single vector representing the cluster, whether originally a single vector or an aggregated vector, to a failure classification signature extractor 280. The failure classification signature extractor 280 can correlate the clusters with the single vector inside with fault causes for system failures as anomalies 285.

Figure 6:
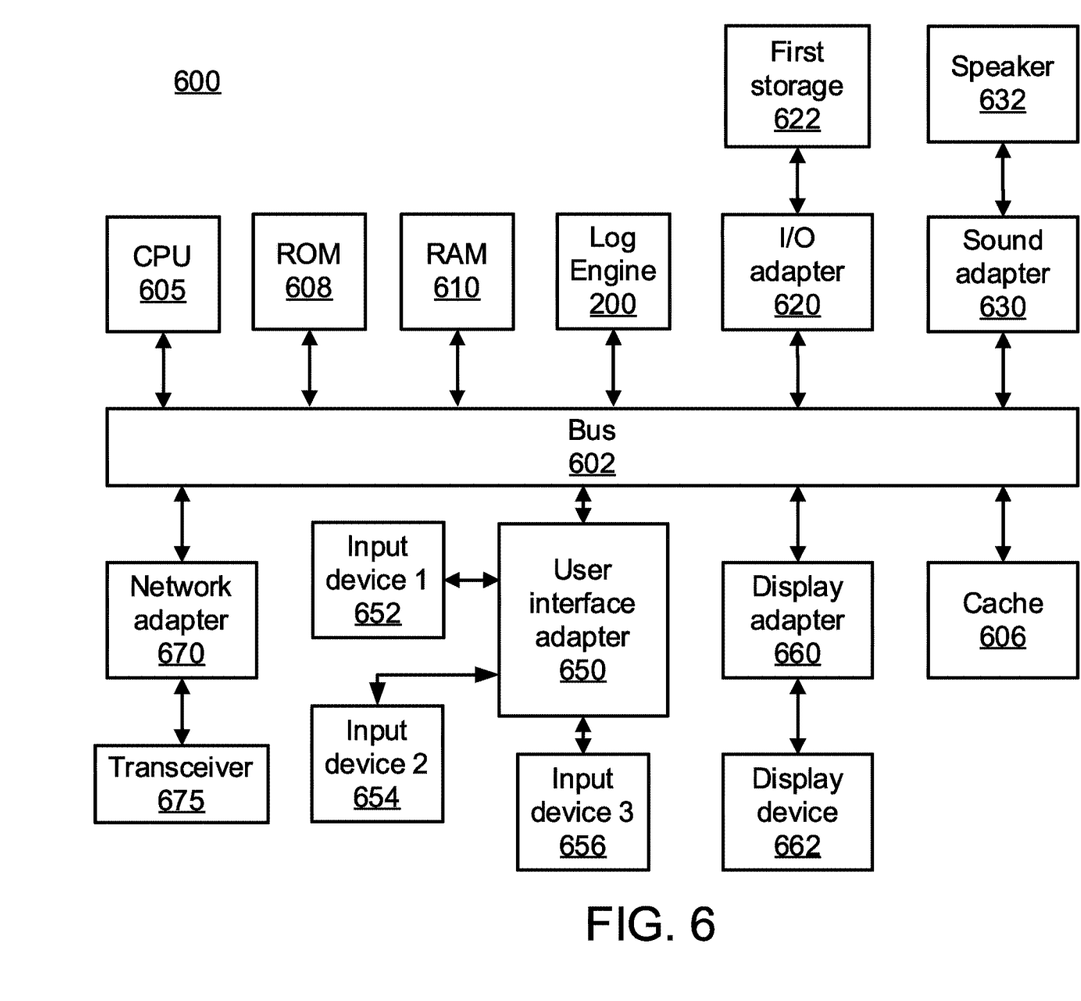
FIG. 6 is a block diagram illustrating a processing system, in accordance with an embodiment of the present invention.

Referring to FIG. 6, an exemplary processing system 600 is shown which may represent a server or a network device, in accordance with an embodiment of the present invention.

The processing system 600 includes at least one processor (CPU) 605 operatively coupled to other components via a system bus 602. The processing system 600 includes a content aware heterogeneous log pattern comparative analysis engine 200 operatively coupled to the other components via the system bus 602. A cache 606, a Read Only Memory (ROM) 608, a Random Access Memory (RAM) 610, an input/output (I/O) adapter 620, a sound adapter 630, a network adapter 670, a user interface adapter 650, and a display adapter 660, are operatively coupled to the system bus 602.

A first storage device 622 is operatively coupled to system bus 602 by the I/O adapter 620. The storage device 622 can be any of a disk storage device (e.g., a magnetic or optical disk storage device), a solid state magnetic device, and so forth.

A speaker 632 may be operatively coupled to system bus 602 by the sound adapter 630. A transceiver 675 is operatively coupled to system bus 602 by network adapter 670. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used. The user input devices 652, 654, and 656 can be the same type of user input device or different types of user input devices. The user input devices 652, 654, and 656 are used to input and output information to and from system 600.

The content aware heterogeneous log pattern comparative analysis engine 200 can detect anomalies 285 from the heterogeneous logs 110 produced by the processing system 600. The anomalies 285 can predict a fault in the processing system 600 or point to an area in the processing system 600 that needs maintenance to avoid a fault or failure. The content aware heterogeneous log pattern comparative analysis engine 200 can also detect anomalies 285 from heterogenous logs the processing system 600 receives through the network adapter 670 from another system or machine. The anomalies 285 can predict a fault in the source system or machine and point to an area in the source system or machine that needs maintenance to avoid a fault or failure.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present invention provided herein.

Moreover, it is to be appreciated that environment 100 described above with respect to FIG. 1 is an environment for implementing respective embodiments of the present invention. Part or all of processing system 500 may be implemented in one or more of the elements of environment 100.

Figure 7:
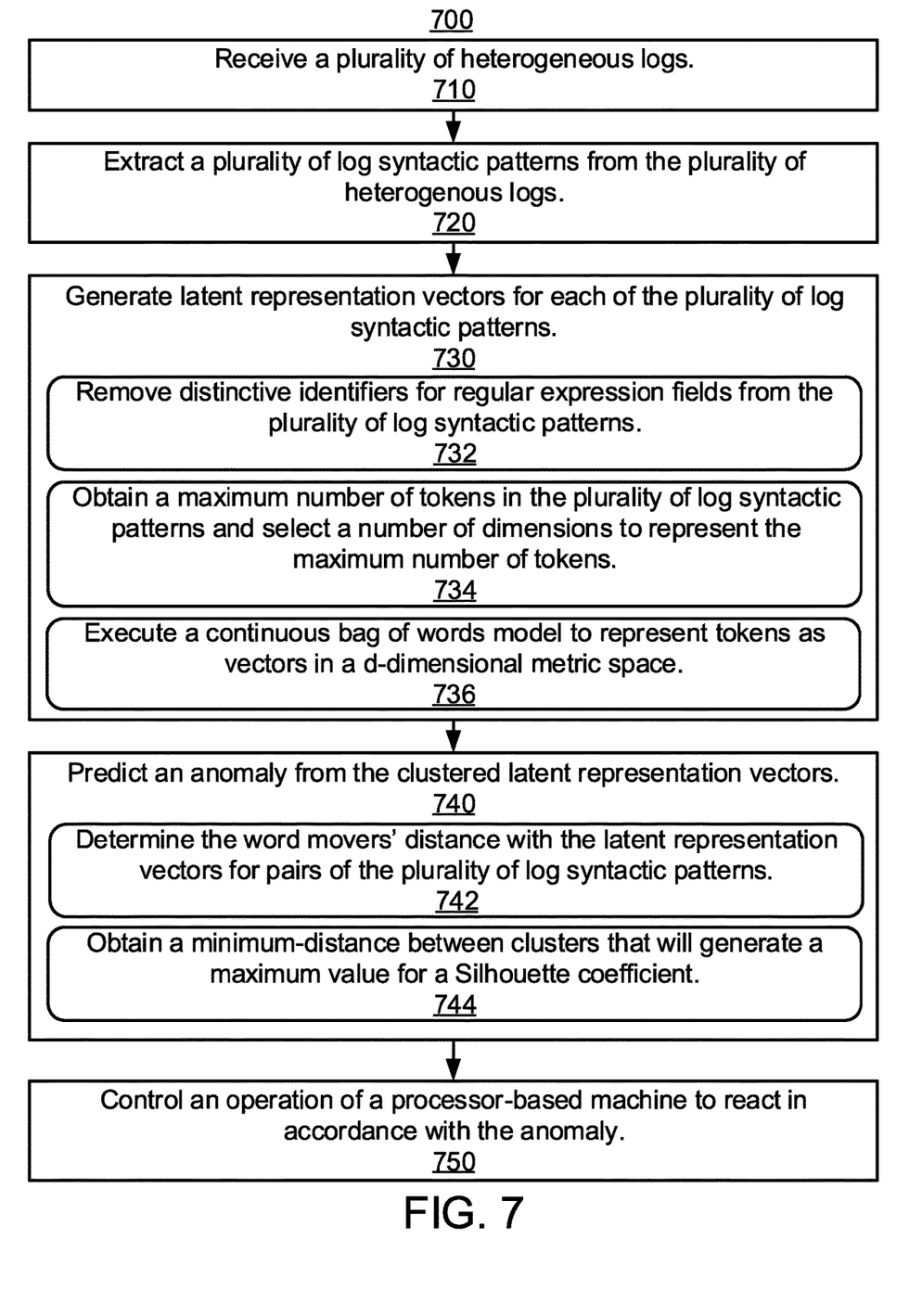
FIG. 7 is a flow diagram illustrating a method for content aware heterogeneous log pattern comparative analysis, in accordance with an embodiment of the present invention.

Further, it is to be appreciated that processing system 500 may perform at least part of the method described herein including, for example, at least part of computer processing system 105 of FIG. 1 and/or at least part of method 700 of FIG. 7.

Referring to FIG. 7, a flow chart for a content aware heterogeneous log pattern comparative analysis method 700 is illustratively shown, in accordance with an embodiment of the present invention. In block 710, receive a plurality of heterogeneous logs. In block 720, extract a plurality of log syntactic patterns from the plurality of heterogenous logs. In block 730, generate latent representation vectors for each of the plurality of log syntactic patterns. In block 732, remove distinctive identifiers for regular expression fields from the plurality of log syntactic patterns. In block 734, obtain a maximum number of tokens in the plurality of log syntactic patterns and select a number of dimensions to represent the maximum number of tokens. In block 736, execute a continuous bag of words model to represent tokens as vectors in a d-dimensional metric space. In block 740, predict an anomaly from the clustered latent representation vectors. In block 742, determine the word movers' distance with the latent representation vectors for pairs of the plurality of log syntactic patterns. In block 744, obtain a minimum-distance between clusters that will generate a maximum value for a Silhouette coefficient. In block 750, control an operation of a processor-based machine to react in accordance with the anomaly.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for content aware heterogeneous log pattern comparative analysis, the method comprising:
   receiving, by a processor-device, a plurality of heterogeneous logs;
   extracting, by the processor-device, a plurality of log syntactic patterns from the plurality of heterogenous logs;
   generating, by the processor-device, latent representation vectors for each of the plurality of log syntactic patterns;
   predicting, by the processor-device, an anomaly from the clustered latent representation vectors; and
   controlling an operation of a processor-based machine to react in accordance with the anomaly;
   wherein the generating includes obtaining a maximum number of tokens in the plurality of log syntactic patterns and selecting a number of dimensions to represent the maximum number of tokens.

2. A content aware heterogeneous log pattern comparative analysis system, system comprising:
   a processing system including a processor and memory coupled to the processor, the processing system programmed to:
      receive a plurality of heterogeneous logs;
      extract a plurality of log syntactic patterns from the plurality of heterogenous logs;
      generate latent representation vectors for each of the plurality of log syntactic patterns;
      predict an anomaly from the clustered latent representation vectors; and
   control an operation of a processor-based machine to react in accordance with the anomaly;
   wherein the processing system is further programmed to obtain a maximum number of tokens in the plurality of log syntactic patterns and selecting a number of dimensions to represent the maximum number of tokens.

* * * * *